(12) United States Patent
Park et al.

(10) Patent No.: US 9,289,834 B2
(45) Date of Patent: Mar. 22, 2016

(54) DOUBLE-SIDED CUTTING INSERT HAVING A CIRCULAR SHAPE AND CUTTING TOOL USING THE SAME

(75) Inventors: Chang Gyu Park, Daegu (KR); Jae Wook Lee, Daegu (KR); Kang Sool Jung, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 259 days.

(21) Appl. No.: 13/320,735

(22) PCT Filed: Apr. 15, 2010

(86) PCT No.: PCT/KR2010/002353
§ 371 (c)(1),
(2), (4) Date: Nov. 15, 2011

(87) PCT Pub. No.: WO2010/134700
PCT Pub. Date: Nov. 25, 2010

(65) Prior Publication Data
US 2012/0070239 A1 Mar. 22, 2012

(30) Foreign Application Priority Data
May 19, 2009 (KR) .................. 10-2009-0043754

(51) Int. Cl.
*B23C 5/00* (2006.01)
*B23C 5/22* (2006.01)
*B23C 5/06* (2006.01)

(52) U.S. Cl.
CPC .............. *B23C 5/06* (2013.01); *B23C 5/2221* (2013.01); *B23C 2200/045* (2013.01); *B23C 2200/125* (2013.01); *B23C 2200/128* (2013.01); *B23C 2210/168* (2013.01); *Y10T 407/1924* (2015.01); *Y10T 407/23* (2015.01)

(58) Field of Classification Search
CPC ................. B23C 5/109; B23C 5/2213; B23C 2200/0444; B23C 2200/123; B23C 2200/126
USPC ....................................... 407/113, 36, 40, 42
See application file for complete search history.

(56) References Cited

U.S. PATENT DOCUMENTS 4,378,184 A * 3/1983 Briese ........................... 407/113
5,441,370 A * 8/1995 Pantzar et al. ................ 407/113

(Continued)

FOREIGN PATENT DOCUMENTS

| CN | 1490105 A | 4/2004 |
|---|---|---|
| CN | 1569370 A | 1/2005 |

(Continued)

OTHER PUBLICATIONS

Official Action dated Jan. 25, 2013 issued in Chinese counterpart application (No. 201080021883.4) with translation.

(Continued)

*Primary Examiner* — Will Fridie, Jr.
(74) *Attorney, Agent, or Firm* — Womble Carlyle

(57) ABSTRACT

A cutting insert has a circular top surface, a bottom surface shaped to be identical to the top surface, a cylindrical side surface for connecting the top and bottom surfaces, and cutting edges formed between the top and side surfaces and between the bottom and side surfaces. The side surface of the cutting insert has a plurality of rotation prevention surfaces substantially perpendicular to the top and bottom surfaces in the circumferential direction of the side surface.

17 Claims, 5 Drawing Sheets

(56) References Cited

U.S. PATENT DOCUMENTS

| | | | |
|---|---|---|---|
| 5,685,670 A * | 11/1997 | Satran | 407/42 |
| 5,772,365 A | 6/1998 | Vogel et al. | |
| 6,053,671 A | 4/2000 | Stedt et al. | |
| 6,126,366 A * | 10/2000 | Lundblad | 407/102 |
| 6,164,878 A | 12/2000 | Satran et al. | |
| 6,234,724 B1 | 5/2001 | Satran et al. | |
| 6,238,133 B1 * | 5/2001 | DeRoche et al. | 403/359.1 |
| 6,575,670 B2 * | 6/2003 | Men | 407/42 |
| 6,607,334 B2 * | 8/2003 | Satran et al. | 407/35 |
| 6,607,335 B2 | 8/2003 | Morgulis | |
| 6,796,750 B2 * | 9/2004 | Men | 407/35 |
| 7,390,149 B2 * | 6/2008 | Wihlborg | 407/35 |
| 7,419,336 B2 * | 9/2008 | Lehto et al. | 407/35 |
| 7,549,358 B2 | 6/2009 | Pantzar | |
| 7,645,100 B2 | 1/2010 | Andersson et al. | |
| 7,908,945 B2 * | 3/2011 | Dufour et al. | 82/1.11 |
| 8,529,168 B2 * | 9/2013 | Michelet et al. | 407/113 |
| 2002/0028116 A1 | 3/2002 | Morgulis | |
| 2002/0094244 A1 * | 7/2002 | Satran et al. | 407/33 |
| 2003/0219320 A1 * | 11/2003 | Horiike et al. | 407/113 |
| 2004/0165961 A1 * | 8/2004 | Nagaya et al. | 407/113 |
| 2006/0210364 A1 | 9/2006 | Bellmann et al. | |
| 2006/0245837 A1 * | 11/2006 | Dufour et al. | 409/132 |
| 2006/0269374 A1 | 11/2006 | Dufour et al. | |
| 2010/0054873 A1 * | 3/2010 | Men et al. | 407/42 |
| 2010/0124465 A1 * | 5/2010 | Morrison et al. | 407/42 |
| 2010/0202839 A1 * | 8/2010 | Fang et al. | 407/53 |
| 2011/0091294 A1 * | 4/2011 | Michelet et al. | 407/42 |
| 2011/0103904 A1 * | 5/2011 | Dufour et al. | 407/47 |
| 2011/0229277 A1 * | 9/2011 | Hoffer et al. | 407/11 |
| 2012/0163929 A1 * | 6/2012 | Dufour et al. | 407/42 |

FOREIGN PATENT DOCUMENTS

| | | |
|---|---|---|
| DE | 4244316 A1 | 6/1994 |
| EP | 1800779 A2 | 6/2007 |
| JP | 61-151804 U | 9/1986 |
| JP | 06-091405 | 4/1994 |
| JP | 07-266102 | 10/1995 |
| JP | 2006-192567 A | 7/2006 |
| JP | 2008036801 A * | 2/2008 |
| WO | WO 98/26893 A1 | 6/1998 |

OTHER PUBLICATIONS

Search Report dated Jan. 25, 2013 issued in Chinese counterpart application (No. 201080021883.4) with translation.

Official Action dated Jan. 21, 2013 issued in RU counterpart application (No. 2011151596).

Official Action dated Mar. 8, 2013 issued in JP counterpart application (No. 2012-508388).

Communication pursuant to Rule 114(2)EPC dated Jun. 3, 2013 issued in European counterpart application (No. 10777887.0) enclosing observations by third party concerning patentability.

Extended European search report dated Oct. 5, 2012 issued in European counterpart application (No. 10777887.0).

Official Action dated Apr. 21, 2013 issued in RU counterpart application (No. 2011151596).

Office Action dated Dec. 6, 2013 issued in Japanese counterpart application (No. 2012-508388).

International Search Report in PCT/KR2010/002353, dated Dec. 21, 2010.

Written Opinion in PCT/KR2010/002353, dated Dec. 21, 2010.

* cited by examiner

DOUBLE-SIDED CUTTING INSERT HAVING A CIRCULAR SHAPE AND CUTTING TOOL USING THE SAME

RELATED APPLICATIONS

This is a 35 USC 371 U.S. National Phase of International Application No. PCT/KR2010/002353, filed 15 Apr. 2010 and published in English as WO 2010/134700 A2 on 25 Nov. 2010, which claims priority to KR 10-2009-0043754, filed 19 May 2009. The contents of the aforementioned applications are incorporated by reference in their entirety.

TECHNICAL FIELD

The present invention relates to a double-sided cutting insert having a circular shape and a cutting tool using the cutting insert. More specifically, the present invention relates to a cutting insert, which may be more safely mounted onto the cutting tool and a cutting tool using the cutting insert.

BACKGROUND ART

Cutting inserts for a milling cutter are mounted onto a plurality of pockets formed in a milling cutter body. Each of the cutting inserts is fixed to each pocket by means of a clamp screw inserted into a screw-hole formed in the central portion of the cutting insert. Such cutting inserts are subject to a rotational torque by the reaction from the workpiece during the cutting process. If the cutting insert is shaped to be polygonal (e.g., triangle, square, etc.), then the cutting insert cannot be rotated, although such a rotational torque is applied. This is because the side surface of the cutting insert is mated with the mounting wall formed in the pocket. However, if the cutting insert is shaped to be circular, then the cutting insert may be rotated and thrown away from the pocket, although the side surface and the receiving wall of the pocket are mated with each other.

In order to solve the above problem, a cutting insert (10) of prior art comprises a plurality of recesses (12) on the lower side surface or a bottom surface of the cutting insert (10) as shown in FIG. 1. Further, a pocket (20) of the milling cutter in which the cutting insert (10) is seated is provided with protrusions (14) for being mated with the recesses (12) of the cutting insert (10) as shown in Fig 2. Accordingly, the cutting insert was prevented from rotating during the cutting process. However, since such a cutting insert (10) may be operated as only a single-sided insert, it was not economical. Also, the side surface portion of the cutting insert (10), which is mated with the protrusions (14) of the pocket, is limited to only the lower surface in which the recesses (12) are formed. Thus, a broad mounting area between the cutting insert (10) and the pocket (20) was not ensured. Accordingly, the cutting insert cannot be stably mounted.

A double-sided cutting insert (30), which prevents a rotation during the cutting process, is disclosed in U.S. Pat. No. 6,607,335 (see FIGS. 3 and ). The cutting insert (30) comprises contact surfaces (32, 32') symmetrically formed in the upper and lower directions and formed in the circumferential direction of the side surface. One of the top contact surface and bottom contact surface (32 or 32') is mated with the tool body (40) to prevent the rotation of the cutting insert. However, since only one of the contact surfaces (32, 32') is mated with the tool body, the mounting area between the cutting insert (30) and the tool body (40) cannot be broad as in the previous case.

Summary

The present invention is adapted to solve the above problems and provide a double-sided circular cutting insert, which ensures a broad mounting area between the cutting insert and the pocket.

The cutting insert of the present invention comprises a circular top surface, a bottom surface shaped to be identical to the top surface, a cylindrical side surface for connecting the top surface and the bottom surface. The side surface of the cutting insert has a plurality of rotation prevention surfaces substantially perpendicular to the top and bottom surfaces in the circumferential direction of the side surface.

According to the present invention, a broad mounting surface between a cutting insert and a pocket may be ensured.

DETAILED DESCRIPTION

The present invention will be explained below in detail with reference to the preferred embodiment.

Figure 1:
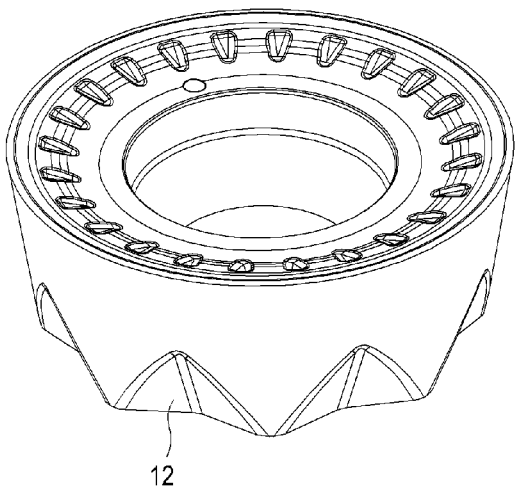
FIG. 1 is a perspective view of a conventional cutting insert.
Figure 2:
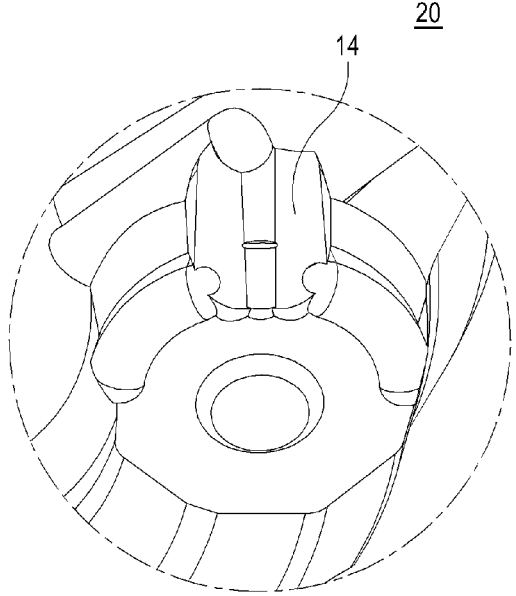
FIG. 2 is a perspective view of a pocket in which the cutting insert of FIG. 1 is seated.
Figure 3:
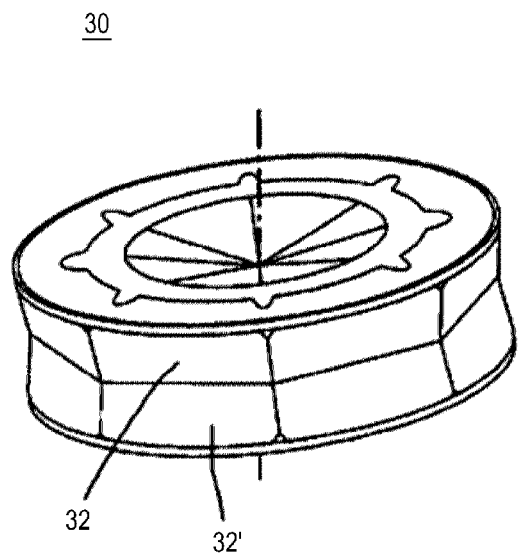
FIG. 3 is a perspective view of a conventional double-sided cutting insert having a circular shape.
Figure 4:
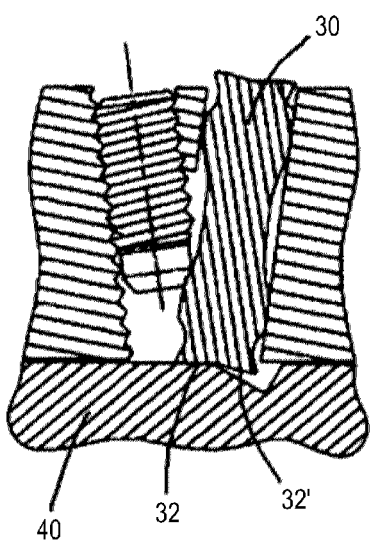
FIG. 4 is a perspective view illustrating the cutting insert of FIG. 3 when it is seated in the tool body.
Figure 5:
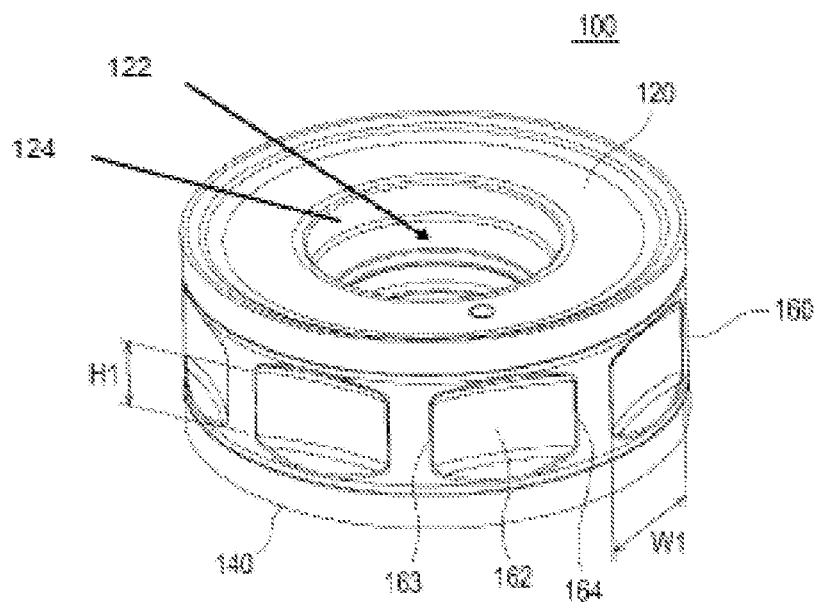
FIG. 5 is a perspective view of the cutting insert according to a first embodiment of the present invention.
Figure 6:
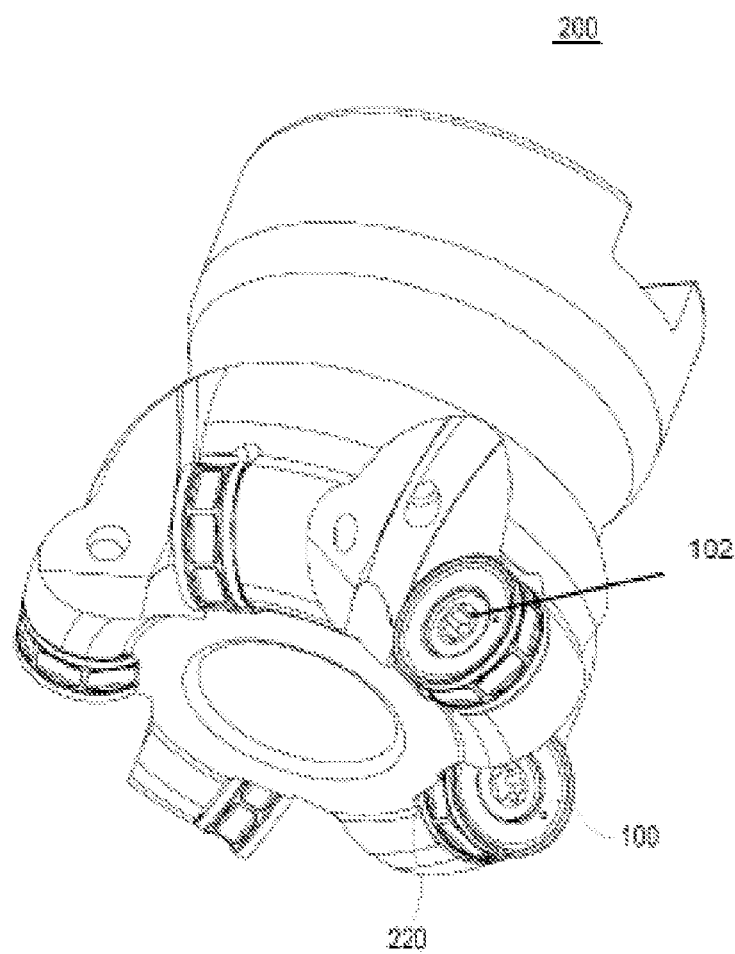
FIG. 6 illustrates the cutting insert of FIG. 5 when it is seated in the milling cutter.
Figure 7:
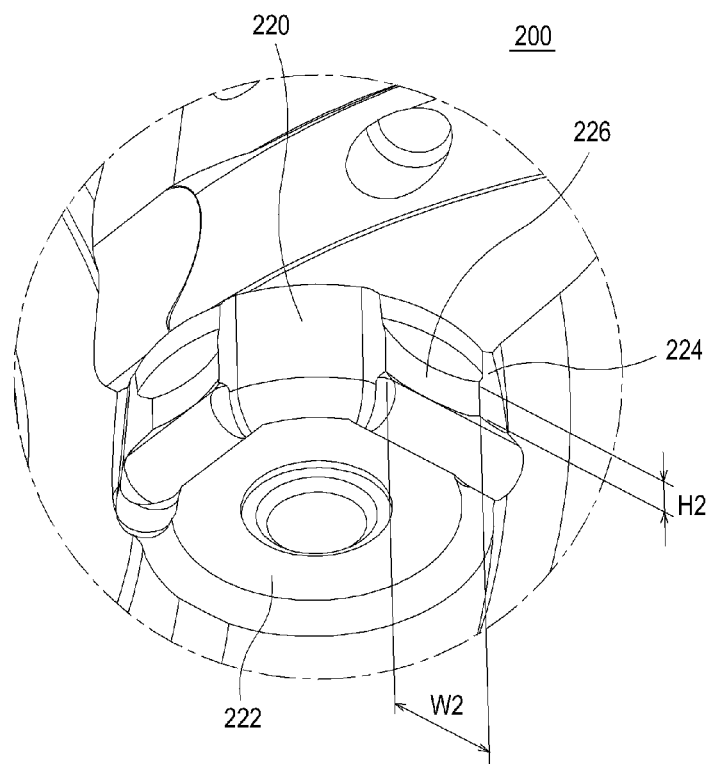
FIG. 7 is a perspective view of a pocket formed in the milling cutter shown in FIG. 6.

FIG. 5 is a perspective view of a cutting insert (100) according to a first embodiment of the present invention. FIG. 6 illustrates the cutting insert (100) when it is mounted to a milling cutter (200). FIG. 7 is an enlarged view of the pocket (220) formed in the milling cutter (100).

As shown in FIG. 5, the cutting insert (100) of the first embodiment comprises: a circular top surface (120); a bottom surface (140) shaped to be identical to the top surface (120); a cylindrical side surface (160) for connecting the top surface (120) and the bottom surface (140); and cutting edges formed between the top surface (120) and the side surface (160) and between the bottom surface (140) and the side surface (160). A mounting bore (122) passes between the top surface (120) and the bottom surface (140). A screw clamping surface (124) is formed at the intersection of the mounting bore (122) with each of the top and bottom surfaces (120, 140) for clamping contact with the underside of the head of the clamping screw (102). The side surface (160) of the cutting insert (100) has a plurality of rotation prevention surfaces (162) substantially perpendicular to the top surface (120) and the bottom surface (140) in the circumferential direction of the side surface (160). The rotation prevention surface (162) is a surface recessed toward the inside of the side surface of the cutting insert.

Also, as illustrated in FIG. 7, the milling cutter (200), to which the cutting insert (100) is mounted, has one or more pockets (220) in which the cutting insert (100) is releaseably fixed. The pocket (220) comprises: a pocket bottom surface (222) in which the top or bottom surface of the cutting insert (100) is seated; and a pocket side surface (224) in which the side surface (160) of the cutting insert is seated. A protruding surface (226) is formed in the pocket side surface (224) for being mated with the rotation prevention surface (162) of the cutting insert (100) to prevent the rotation of the cutting insert. Each protruding surface (226) has a thickness (H2) measured in a second height direction perpendicular to the pocket bottom surface (222), and a width (W2) measured in a second width direction perpendicular to the second height direction.

Since the rotation prevention surfaces (162) are formed substantially perpendicularly to the top surface (120) and the bottom surface (140) in the circumferential direction of the side surface (160), the area of such rotation prevention surfaces (162) may be large in the side surface (160) of the cutting insert. Thus, the cutting insert (100) may be more safely mounted to the pocket (220).

The pocket side surface (224) preferably comprises two protruding surfaces (226), which are spaced apart from each other by 90°. The protruding surfaces (226) spaced apart from each other by 90° may prevent the cutting insert from rotating more safely than those spaced apart by an acute angle. Thus, the force applied to the cutting insert due to the rotational torque during cutting may not be excessively concentrated into each protruding surface (226) of the pocket. Further, the cutting insert comprises four or eight rotation prevention surfaces (162), which are spaced from each other at an equal angle in the circumferential direction on the side surface (160) of the cutting insert. If the protruding surfaces (226) are spaced apart from each other by 90°, then the rotation prevention surfaces (162) may be effectively mated with the protruding surfaces (226) regardless of whether the number of rotation prevention surfaces (162) is four or eight.

Also, the thickness (H2) of the protruding surface (226) in the upper and lower directions is preferably smaller than that (H1) of the rotation prevention surface (162). If the upper cutting edge is worn and cannot perform a cutting operation, then the cutting insert should be turned over in order to be seated in the pocket. If the thickness (H2) of the protruding surface (226) in the upper and lower directions is smaller than that (H1) of the rotation prevention surface (162), even though there are any tolerances on the thicknesses of the protruding surfaces (226) and the rotation prevention surfaces (162), the rotation prevention surfaces (162) may be effectively mated with the protruding surfaces (226) of the pocket. Accordingly, costs and efforts for manufacturing the cutting insert may be reduced. In such a case, the thickness (H2) of the protruding surface (226) in the upper and lower directions is smaller than that (H1) of the rotation prevention surface (162), preferably by 0.1 mm or more. Also, both of the edges (163, 164), which extend in the upper and lower directions of the rotation prevention surface (162), preferably exist on or inside the circumference of the side surface (160) of the cutting insert.

Figure 8:
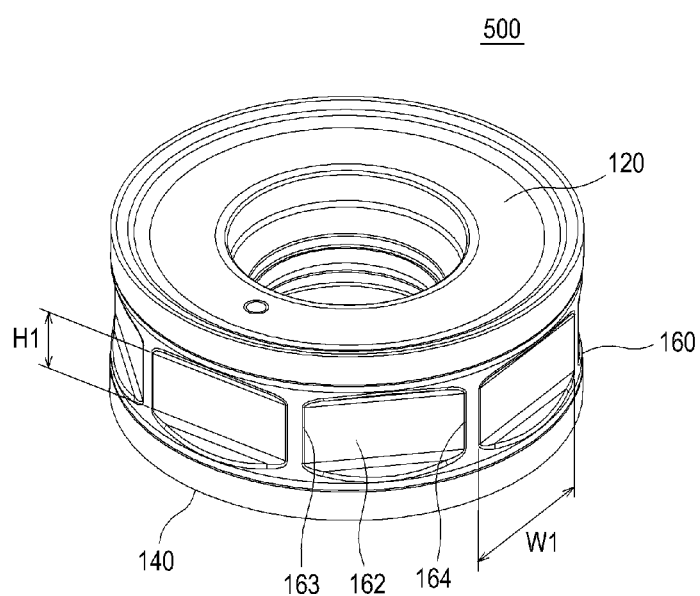
FIG. 8 is a perspective view of the cutting insert according to a second embodiment of the present invention.

FIG. 8 is a perspective view of the cutting insert (500) according to a second embodiment of the present invention Like reference numerals denote like components shown for the first embodiment of the present invention. However, the rotation prevention surface (162) of the second embodiment is a flat surface, contrary to that of the first embodiment of FIG. 5 in which the rotation prevention surface (162) is curved in the first width direction. The flat-shaped rotation prevention surface (162) may perform the function of preventing the rotation of the cutting insert even when the dimension of the flat-shaped rotation prevention surface (162) is not accurate as is initially designed. Accordingly, costs and efforts for manufacturing the cutting insert may be considerably reduced.

Although the present invention was explained as above with reference to its preferred embodiments, such embodiments of the present invention are only exemplary. A person skilled in the art should understand that various modifications to the embodiments may be also applied without departing from the scope of the present invention.

Figure 9:
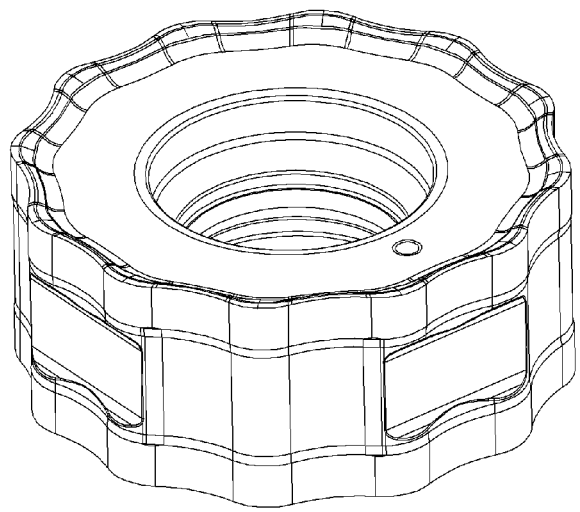
FIG. 9 is a perspective view of the cutting insert according to a third embodiment of the present invention.
Figure 10:
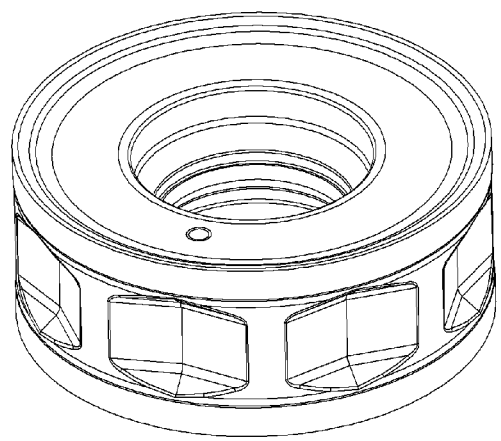
FIG. 10 is a perspective view of the cutting insert according to a fourth embodiment of the present invention.

For example, FIG. 6 illustrates that the cutting insert (100) is secured to the milling cutter (200) by means of a clamping screw (102). The clamping screw (102) is configured to pass through the cutting insert's mounting bore (122) via the latter's exposed top surface (120), to releasibly fix the cutting insert (100) within the pocket (220), after the cutting insert (100) is seated in the pocket (220). However, an embodiment for securing the cutting insert by means of a wedge may be also considered. Further, FIG. 5 illustrates that the cutting edges are exactly circular. However, as illustrated in FIG. 9, an embodiment in which the cutting edges have serrated shapes may be also considered. Also, FIG. 8 illustrates that the rotation prevention surface (162) is a single flat surface. However, as shown in FIG. 10, an embodiment in which the rotation prevention surface comprises two surfaces inclined at an angle from each other may be also considered. Moreover, in the above embodiments, the cutting insert (100) is secured to a milling cutter (200). However, an embodiment for securing the cutting insert into a lathe may be also considered. Such a modification would be considered as an obvious modification to one of ordinary skill in the art.

INDUSTRIAL APPLICABILITY

According to the present invention, a broad mounting surface between a cutting insert and a pocket may be ensured.

The invention claimed is:
1. A cutting tool, comprising:
a tool body having at least one pocket; and
at least one double-sided cutting insert releasibly fixed to the pocket by a clamping screw, the cutting insert comprising:
a circular top surface, a bottom surface shaped to be identical to the top surface, a cylindrical side surface for connecting the top and bottom surfaces, a mounting bore passing between the top surface and the bottom surface, and cutting edges formed between the top and side surfaces and between the bottom and side surfaces;
wherein the side surface of the cutting insert has a plurality of rotation prevention surfaces substantially perpendicular to the top and bottom surfaces, each rotation prevention surface being recessed radially inwardly from the cylindrical side surface of the cutting insert, having a thickness measured in a first height direction extending between the top surface and the bottom surface, and having a width measured in a first width direction perpendicular to the first height direction;
wherein each rotation prevention surface has a pair of edges which exist inside a circumference of the cylindrical side surface and extend in upper and lower directions between the top and bottom surfaces;
wherein each rotation prevention surface is symmetrically formed in said upper and lower directions;
wherein the pocket of the tool body comprises:

a pocket bottom surface in which the top surface or the bottom surface of the cutting insert is seated; and a pocket side surface in which the side surface of the cutting insert is seated; and wherein a protruding surface is formed in the pocket side surface for being mated with one of the rotation prevention surfaces of the cutting insert to prevent the rotation of the cutting insert, the protruding surface having a thickness measured in a second height direction perpendicular to the pocket bottom surface, and a width measured in a second width direction perpendicular to the second height direction, wherein the clamping screw is configured to pass through the mounting bore via the cutting insert's exposed top surface, to thereby releasibly fix the insert to the pocket after the cutting insert is seated in the pocket.

2. The cutting tool of claim 1, wherein each rotation prevention surface is a flat surface.

3. The cutting tool of claim 1, wherein each rotation prevention surface comprises two surfaces inclined at an angle from each other.

4. The cutting tool of claim 1, wherein the thickness of the protruding surface is smaller than the thickness of the rotation prevention surface.

5. The cutting tool of claim 4, wherein the thickness of the protruding surface is smaller than the thickness of the rotation prevention surface by 0.1 mm or more.

6. The cutting tool of claim 1, wherein the pocket side surface comprises two protruding surfaces spaced apart by 90°.

7. The cutting tool of claim 6, wherein the cutting insert comprises four rotation prevention surfaces spaced apart at equal angles along the cylindrical side surface of the cutting insert.

8. The cutting tool of claim 6, wherein the cutting insert comprises eight rotation prevention surfaces spaced apart at equal angles along the cylindrical side surface of the cutting insert.

9. The cutting tool of claim 1, wherein the cutting edges have a serrated shape.

10. A double-sided cutting insert, comprising:
a circular top surface;
a bottom surface shaped to be identical to the top surface;
a cylindrical side surface for connecting the top and bottom surfaces;
a mounting bore passing between the top surface and the bottom surface;
a screw clamping surface formed at the intersection of the mounting bore with each of the top and bottom surfaces; and
cutting edges formed between the top and side surfaces and between the bottom and side surfaces;
wherein the side surface of the cutting insert has a plurality of rotation prevention surfaces substantially perpendicular to the top and bottom surfaces and spaced apart from one another in a circumferential direction of the side surface, each rotation prevention surface being recessed radially inwardly from the cylindrical side surface of the cutting insert, having a thickness measured in a first height direction extending between the top surface and the bottom surface, and having a width measured in a first width direction perpendicular to the first height direction, wherein each rotation prevention surface has a pair of edges which exist inside a circumference of the cylindrical side surface and extend in upper and lower directions between the top and bottom surfaces, edges belonging to adjacent rotation prevention surfaces being spaced apart from one another;

wherein each rotation prevention surface is symmetrically formed in said upper and lower directions; and wherein the mounting bore is configured to receive a clamping screw via the cutting insert's top surface, after the insert is seated in a pocket of a cutting tool.

11. The double-sided cutting insert according to claim 10, wherein:
a total of eight rotation prevention surfaces are provided on the side surface of the cutting insert.

12. The double-sided cutting insert according to claim 11, wherein:
each rotation prevention surface comprises two surfaces inclined at an angle from each other.

13. The double-sided cutting insert according to claim 11, wherein:
the cutting edges have a serrated shape.

14. The cutting tool of claim 1, wherein:
the pocket side surface comprises two protruding surfaces spaced apart by 90°;
the cutting insert comprises eight rotation prevention surfaces spaced apart at equal angles along the cylindrical side surface of the cutting insert; and
exactly two of the eight rotation prevention surfaces contact the two protruding surfaces of the pocket side surface; and
the thickness of each of the protruding surfaces is smaller than the thickness of each of the rotation prevention surfaces by 0.1 mm or more.

15. The cutting tool of claim 1, wherein each rotation prevention surface is curved in the first width direction.

16. The double-sided cutting insert according to claim 10, wherein each rotation prevention surface is curved in the first width direction.

17. A double-sided cutting insert, comprising:
a circular top surface;
a bottom surface shaped to be identical to the top surface;
a cylindrical side surface for connecting the top and bottom surfaces; and
cutting edges formed between the top and side surfaces and between the bottom and side surfaces;
wherein the side surface of the cutting insert has a plurality of rotation prevention surfaces that are spaced apart from one another at an equal angle in a circumferential direction of the cylindrical side surface of the cutting insert and are substantially perpendicular to the top and bottom surfaces,
wherein each rotation prevention surface has a pair of edges which exist inside a circumference of the cylindrical side surface and extend in upper and lower directions between the top and bottom surfaces, edges belonging to adjacent rotation prevention surfaces being spaced apart from one another; and
wherein each rotation prevention surface is symmetrically formed in said upper and lower directions.

* * * * *